US012596382B2

(12) United States Patent　　　(10) Patent No.:　US 12,596,382 B2

Yaegashi et al.　　　(45) Date of Patent:　Apr. 7, 2026

(54) MOVING BODY CONFIGURED TO LEAD A VEHICLE BASED ON SENSING A REGION AROUND THE VEHICLE

(71) Applicant: TOYOTA JIDOSHA KABUSHIKI KAISHA, Toyota (JP)

(72) Inventors: Kazuo Yaegashi, Tokyo (JP); Hiroki Izu, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 18/631,519

(22) Filed: Apr. 10, 2024

(65) Prior Publication Data

US 2024/0353857 A1　　Oct. 24, 2024

(30) Foreign Application Priority Data

Apr. 24, 2023　　(JP) ................................. 2023-070953

(51) Int. Cl.
| | |
|---|---|
| *B60W 30/165* | (2020.01) |
| *G05D 1/242* | (2024.01) |
| *G05D 1/617* | (2024.01) |
| *G05D 1/622* | (2024.01) |
| *G05D 1/695* | (2024.01) |
| *G05D 1/698* | (2024.01) |
| *G05D 111/10* | (2024.01) |
| *G05D 111/20* | (2024.01) |

(52) U.S. Cl.
CPC ........... *G05D 1/617* (2024.01); *G05D 1/6985* (2024.01); *G05D 2111/17* (2024.01); *G05D 2111/20* (2024.01)

(58) Field of Classification Search
CPC .. G05D 1/617; G05D 1/6985; G05D 2111/17; G05D 2111/20
See application file for complete search history.

(56) References Cited

U.S. PATENT DOCUMENTS

| | | | | |
|---|---|---|---|---|
| 11,367,358 | B1 * | 6/2022 | Vemuri | .................... G08G 1/22 |
| 2015/0153733 | A1 | 6/2015 | Ohmura et al. | |
| 2018/0038952 | A1 * | 2/2018 | Shokonji | ................. G01S 15/86 |
| 2018/0188746 | A1 * | 7/2018 | Lesher | ................. G05D 1/0217 |
| 2018/0348791 | A1 * | 12/2018 | Hendrickson | ........ G05D 1/0293 |
| 2019/0096265 | A1 * | 3/2019 | Mok | ....................... G08G 1/163 |
| 2019/0174286 | A1 * | 6/2019 | Guo | ....................... H04W 72/02 |
| 2019/0227555 | A1 * | 7/2019 | Sun | ......................... G08G 1/142 |
| 2020/0004269 | A1 | 1/2020 | Oba | |
| 2020/0027355 | A1 * | 1/2020 | Sujan | ...................... H04W 4/46 |
| 2020/0193839 | A1 * | 6/2020 | Kamata | ................. G06F 3/0482 |

(Continued)

FOREIGN PATENT DOCUMENTS

| | | |
|---|---|---|
| JP | 2004-217138 A | 8/2004 |
| JP | 2015-108860 A | 6/2015 |

(Continued)

*Primary Examiner* — Scott A Browne
*Assistant Examiner* — Rami Nabih Bedewi
(74) *Attorney, Agent, or Firm* — OLIFF PLC.

(57) ABSTRACT

A moving body capable of autonomously traveling and having a function of leading a first vehicle that travels while following the moving body, the moving body comprises a first sensor that detects an obstacle; and a controller configured to execute sensing of a region around the first vehicle by the first sensor before the moving body starts leading the first vehicle.

5 Claims, 6 Drawing Sheets

(56)         References Cited

U.S. PATENT DOCUMENTS

| 2020/0282990 A1* | 9/2020 | Sato ...................... B60W 30/12 |
| 2020/0324768 A1* | 10/2020 | Switkes ................... G08G 1/22 |
| 2021/0182997 A1* | 6/2021 | Klingemann .... G06Q 10/06315 |
| 2023/0069005 A1* | 3/2023 | Oyanagi ............. B60W 30/165 |
| 2023/0252896 A1* | 8/2023 | Xu ...................... G08G 1/0125 |
| | | 701/117 |

FOREIGN PATENT DOCUMENTS

| JP | 2020-086866 A | 6/2020 |
| JP | 2020-144789 A | 9/2020 |
| JP | 2020-149238 A | 9/2020 |
| WO | 2018/147041 A1 | 8/2018 |

* cited by examiner

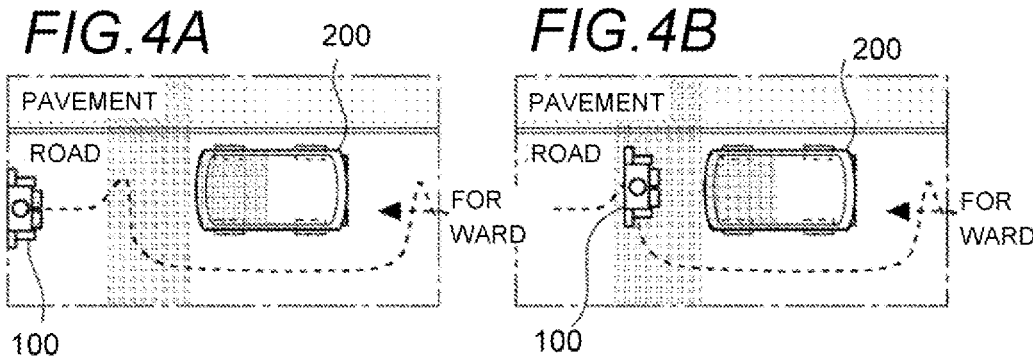
*FIG.4A*
*FIG.4B*
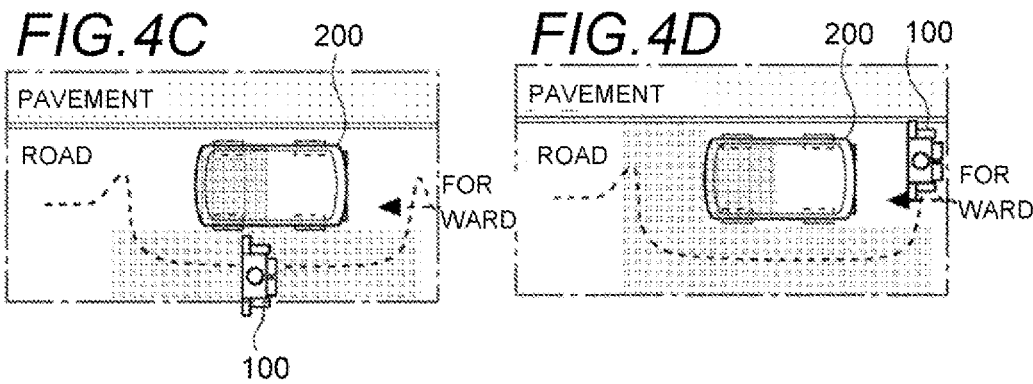
*FIG.4C*
*FIG.4D*
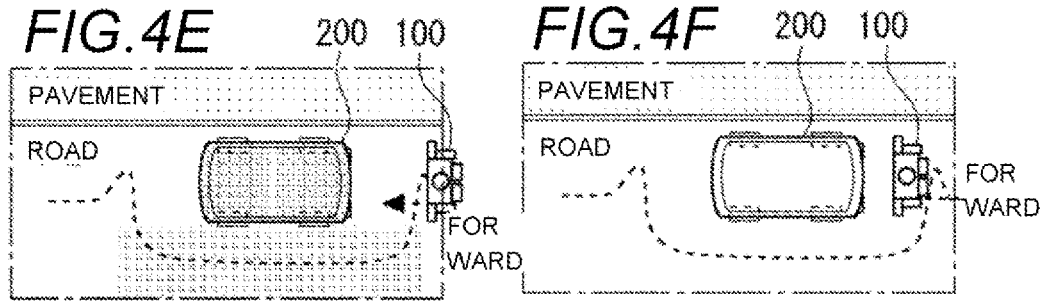
*FIG.4E*
*FIG.4F*

MOVING BODY CONFIGURED TO LEAD A VEHICLE BASED ON SENSING A REGION AROUND THE VEHICLE

CROSS REFERENCE TO THE RELATED APPLICATION

This application claims the benefit of Japanese Patent Application No. 2023-070953, filed on Apr. 24, 2023 which is hereby incorporated by reference herein in its entirety.

BACKGROUND

Technical Field

The present disclosure relates to a moving body that autonomously moves.

Description of the Related Art

A number of techniques related to autonomous driving of a vehicle are known.

Concerning this, for example, Japanese Patent Laid-Open No. 2015-108860 discloses a vehicle control device that recognizes a vehicle that leads an own vehicle and controls the own vehicle so as to travel while following the leading vehicle.

SUMMARY

The present disclosure is directed to confirming safety around a vehicle that travels while following a moving body.

One aspect of an embodiment of the present disclosure is A moving body capable of autonomously traveling and having a function of leading a first vehicle that travels while following the moving body, the moving body comprising:

a first sensor that detects an obstacle; and a controller configured to execute sensing of a region around the first vehicle by the first sensor before the moving body starts leading the first vehicle.

Further, other aspects include a method to be executed by the above-described device, a program for causing a computer to execute the method, or a computer-readable storage medium non-temporarily storing the program.

According to the present disclosure, it is possible to confirm safety around a vehicle that travels while following a moving body.

BRIEF DESCRIPTION OF THE DRAWINGS

FIGS. 4A to 4F are views illustrating outline of safety confirmation of a region around a first vehicle to be performed by the moving body according to the first embodiment.

DESCRIPTION OF THE EMBODIMENTS

Figures 1A, 1B, 1C, 1D:
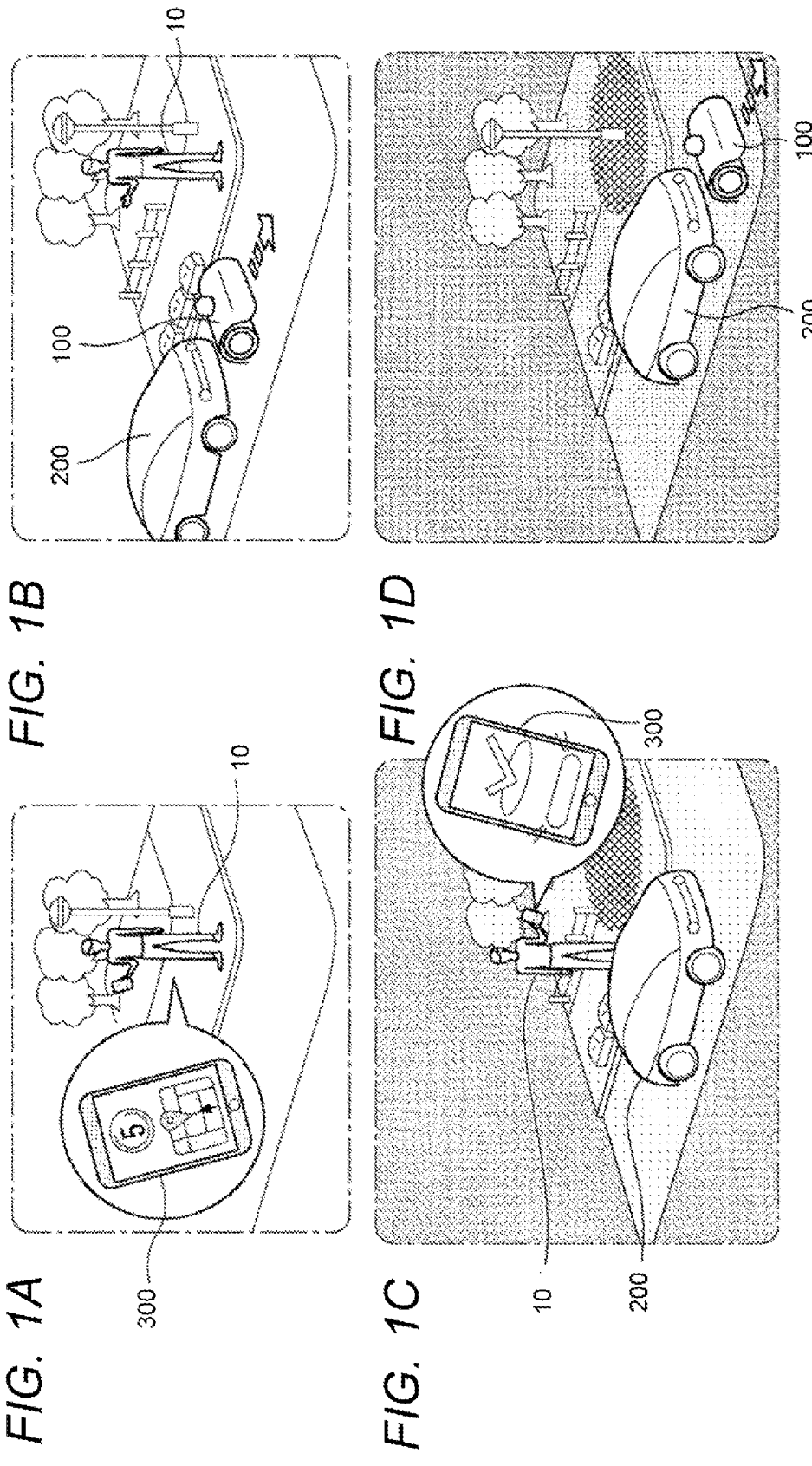
FIGS. 1A to 1D are conceptual diagrams of a service in which a moving body leads a vehicle.

A moving body that leads an arbitrary vehicle by autonomously traveling is known.

In a case where a vehicle is started, it is desirable to confirm that there is no obstacle, or the like, around the vehicle by sensing a region around the vehicle that is stopped.

However, there is a case where, as a result of regions behind, on a left side, on a right side and under the vehicle becoming blind areas depending on arrangement, or the like, of sensors provided in the vehicle, safety confirmation of the regions cannot be sufficiently performed.

The present disclosure solves this problem by causing a moving body that leads the vehicle to sense a region around the vehicle from outside.

The present disclosure in its one aspect provides a moving body capable of autonomously traveling and having a function of leading a first vehicle that travels while following the moving body, the moving body comprising: a first sensor that detects an obstacle; and a controller configured to execute sensing of a region around the first vehicle by the first sensor before the moving body starts leading the first vehicle.

The first sensor, which is a sensor mounted on the moving body, is a sensor for detecting an obstacle, or the like, existing around the first vehicle. The first sensor is, specifically, a LiDAR, a camera, a radar, a sonar, or the like.

The first vehicle is a vehicle having a function of traveling while following a moving body that travels ahead of the vehicle. For example, the first vehicle may be a vehicle having a function of semi-autonomously traveling on the basis of information, and the like, transmitted from the moving body.

In other words, the first vehicle may be a vehicle not capable of autonomously traveling alone, but capable of autonomously traveling by receiving assistance by the moving body.

The controller performs sensing of a region around the first vehicle with the first sensor before the moving body starts leading the first vehicle. The region around the first vehicle is, for example, a region in all directions around the first vehicle and under the first vehicle. The sensing refers to detection as to whether or not there is an obstacle using an optical wave, an electric wave, a sound wave, and the like, by a LiDAR, a radar and a sonar, or image data, and the like, captured by a camera.

The moving body, for example, senses the region around the first vehicle from outside before starting leading the first vehicle. In this event, the moving body may go around the first vehicle in all directions so that a blind area does not occur in sensing. This enables the moving body to sense also a region that cannot be sensed from the first vehicle.

The controller may determine whether or not the first vehicle can start traveling on a basis of a first sensing result that is a result of sensing of the region around the first vehicle by the first sensor, and may start leading the first vehicle, in a case where it is determined that the first vehicle can start traveling.

This, for example, enables the moving body to start leading the first vehicle on the basis of judgement that safety around the first vehicle is sufficiently confirmed.

The controller may receive from the first vehicle, a second sensing result which is a result of sensing of the region around the first vehicle by a second sensor mounted on the first vehicle and which includes information regarding a partial region for which sensing is executed by the second sensor among the region around the first vehicle, and may determine a partial region to be sensed by the first sensor among the region around the first vehicle on a basis of the second sensing result.

For example, in a case where the first vehicle has a function of sensing a region around the own vehicle, the moving body may sense a region different from a region that has already been sensed by the first vehicle. This enables the moving body to sense a region that is not sufficiently sensed, in a complementary manner.

The controller may receive from the first vehicle, a third sensing result which is a result of sensing of the region around the first vehicle by a second sensor mounted on the first vehicle and which includes information regarding a partial region for which sensing is executed by the second sensor among the region around the first vehicle and information regarding a type of the second sensor, and may sense the partial region for which sensing is executed by the second sensor using the first sensor that is a sensor of a type different from the type of the second sensor on a basis of the third sensing result.

There is a case where different types of sensors are used as the first sensor and the second sensor. Further, there is a case where recognition accuracy of an obstacle, or the like, differs depending on types of sensors. Thus, the moving body may execute sensing on the same partial region by utilizing a sensor of a type different from a type of the sensor mounted on the first vehicle. By this means, it is possible to recognize an obstacle, or the like, with higher accuracy.

The controller may calculate reliability of obstacle detection using the second sensor in respective partial regions constituting the region around the first vehicle on a basis of the third sensing result received from the first vehicle, and may sense the partial region for which the reliability is lower than a predetermined threshold using the first sensor that is the sensor of the type different from the type of the second sensor.

The reliability can be calculated on the basis of the data acquired by the second sensor, a type of the second sensor, weather, and the like. For a region with the reliability lower than a predetermined threshold, sensing is preferably performed again by the moving body.

Specific embodiments of the present disclosure will be described below on the basis of the drawings. A hardware configuration, a module configuration, functional components, and the like, described in each embodiment are not intended to limit a technical scope of the disclosure unless otherwise specified.

First Embodiment

Outline of a moving body according to embodiments will be described with reference to FIGS. 1A to 1D. FIGS. 1A to 1D are conceptual diagrams of a service in which the moving body according to the embodiments leads a vehicle. A moving body 100 according to the present embodiment has a function of traveling by autonomous driving and leading a first vehicle 200. The moving body 100 performs wireless communication with the first vehicle 200 and transmits an instruction for traveling to the first vehicle 200. The first vehicle 200, which is a vehicle having a function of traveling while following the moving body 100, travels in accordance with the instruction transmitted from the moving body 100.

In the present embodiment, the first vehicle 200 is a vehicle rented by a user in a car sharing service.

The car sharing service in the present embodiment is a service in which a vehicle can be allocated to an arbitrary point (hereinafter, a getting-on point) designated by a user and can be returned to (that is, the vehicle can be dropped-off at) an arbitrary point (hereinafter, a return point). In a case where such a service is provided in an unmanned manner, a case can occur where the vehicle should be caused to autonomously travel to be repositioned.

On the other hand, in a case where the first vehicle 200 is not a completely autonomous vehicle, but a semi-autonomous vehicle (for example, a vehicle capable of autonomously traveling by receiving provision of information from outside), a similar service can be implemented by the moving body 100 leading the first vehicle 200.

In the present embodiment, the moving body 100 leads the first vehicle 200 in sections from a station to which the vehicle belongs to a designated getting-on point, and from a return point to the station. This enables a vehicle to be handed over at an arbitrary point even if the first vehicle 200 is not a completely autonomous vehicle.

First, outline of a method for handing over the first vehicle 200 in a car sharing service will be described.

First, as illustrated in FIG. 1A, a user 10 reserves the first vehicle 200 that the user desires to utilize in car sharing using an information terminal 300. For example, the user 10 accesses a management server that manages the car sharing service and reserves the first vehicle 200.

When the management server accepts reservation of the first vehicle 200, the management server specifies the first vehicle 200 that stands by in a station and the moving body 100 that leads the first vehicle 200. Then, the management server instructs the moving body 100 to lead the first vehicle 200 to a getting-on point of the user 10.

Then, as illustrated in FIG. 1B, the first vehicle 200 is moved to the getting-on point by the moving body 100 leading the first vehicle 200 by autonomously traveling.

The first vehicle 200 semi-autonomously travels from the station to the getting-on point designated by the user 10 on the basis of the instruction transmitted from the moving body 100 that travels ahead of the first vehicle 200.

When the first vehicle 200 reaches the designated getting-on point, the first vehicle 200 is handed over to the user 10. Then, the moving body 100 returns to a standby place such as a station by autonomously driving. The user 10 can utilize the first vehicle 200 by driving the first vehicle 200 himself/herself during a vehicle reservation period.

Next, processing when the vehicle is returned will be described. As illustrated in FIG. 1C, after the user 10 finishes using the first vehicle 200, the user 10 transmits a request that he/she desires to return the first vehicle 200 (hereinafter, a return request) to the management server from the information terminal 300 at a predetermined point (return point).

The point at which the first vehicle 200 is returned does not have to be a station, or the like, of car sharing. In other words, the first vehicle 200 may be dropped off. In the present embodiment, the first vehicle 200 is moved from the return point to a predetermined station by the moving body 100 leading the first vehicle 200.

The management server that receives the return request selects the moving body 100 for guiding the first vehicle 200 from the return point to the station and transmits an instruction to reposition the first vehicle 200 to the moving body 100.

As illustrated in FIG. 1D, the moving body 100 arrives at the return point designated by the user 10 by autonomously driving in accordance with the instruction from the management server. Then, the moving body 100 leads the first vehicle 200 by autonomously driving and guides the first vehicle 200 to the standby place such as the station.

In this manner, the moving body 100 travels by autonomously driving and leads the first vehicle 200 having a function of traveling while following the moving body 100. The first vehicle 200 travels by semi-autonomously driving on the basis of the instruction transmitted from the moving body 100. In other words, by the moving body 100 having an autonomous driving function leading the first vehicle 200 that does not have an autonomous driving function, even a vehicle that does not have an autonomous driving function can travel in a similar manner to a vehicle having an autonomous driving function.

In the above-described example, the first vehicle 200 can be moved from the station of car sharing to the designated getting-on point by the moving body 100 leading the first vehicle 200. Further, in a similar manner, the first vehicle 200 can be moved from the return point to the station. In other words, even if the first vehicle 200 is not an autonomous vehicle, the first vehicle 200 can be delivered to an arbitrary point without human intervention.

Note that during a period while the moving body 100 guides the first vehicle 200, the first vehicle 200 becomes unmanned. However, there is a case where safety confirmation when the first vehicle 200 is started is insufficient only with sensors mounted on the first vehicle 200. Thus, in the present embodiment, before the first vehicle 200 is started, the moving body 100 that leads the first vehicle 200 assists safety confirmation around the first vehicle 200. A specific method will be described later.

Figure 2:
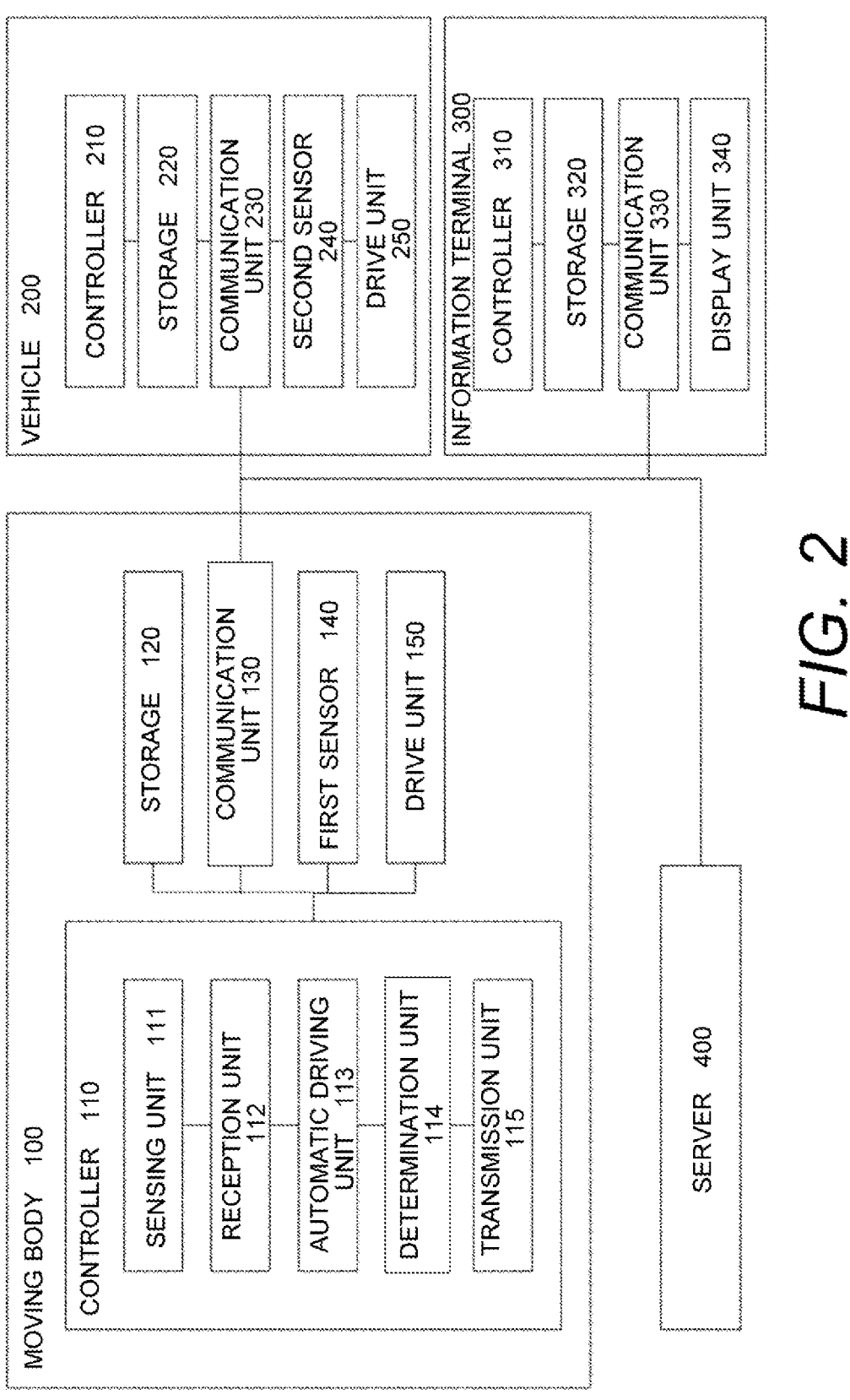
FIG. 2 is a view for explaining components of a system including a moving body according to a first embodiment.

Next, respective components constituting the system will be described in detail. FIG. 2 is a view for explaining components of the system including the moving body 100 according to the embodiment.

The moving body 100 according to the present embodiment includes a controller 110, a storage 120, a communication unit 130, a first sensor 140, and a drive unit 150. The moving body 100 performs wireless communication with the first vehicle 200 and transmits an instruction for traveling to the first vehicle 200.

The controller 110 is implemented with a controller such as a central processing unit (CPU) and a graphics processing unit (GPU), and a memory. The controller 110 includes a sensing unit 111, a reception unit 112, an automatic driving unit 113, a determination unit 114, and a transmission unit 115 as functional modules. These functional modules may be implemented by programs being executed by the controller 110.

The sensing unit 111 performs sensing of a region around the first vehicle 200 with the first sensor 140. As described above, the sensing of the region around the first vehicle 200 refers to determination as to whether or not there is an obstacle, or the like, in all directions around the first vehicle 200 and under the first vehicle 200.

The automatic driving unit 113 determines whether or not the first vehicle 200 can start traveling on the basis of a result (first sensing result) of sensing of the region around the first vehicle 200 by the first sensor 140. Specifically, the automatic driving unit 113 may determine whether or not an obstacle is detected in the region around the first vehicle 200 by the first sensor 140. Further, the automatic driving unit 113 may determine that the first vehicle 200 can start traveling in a case where an obstacle is not detected in the region around the first vehicle 200 by the first sensor 140. Note that a range of sensing by the first sensor 140 is determined by the determination unit 114 which will be described later.

In a case where it is determined that the first vehicle 200 can start traveling, the automatic driving unit 113 causes the moving body 100 to autonomously travel by controlling the drive unit 150 which will be described later and leads the first vehicle 200. Further, during leading, the automatic driving unit 113 transmits information (hereinafter, instruction information) necessary for following traveling to the first vehicle 200.

The instruction information may include, for example, sensor information acquired by the moving body 100 and information (such as, for example, information regarding an obstacle on the road and information regarding traffic lights and traffic rules) determined on the basis of the sensor information.

The determination unit 114 determines a region to be sensed by the first sensor 140. For example, regions in front of, behind, on a left side, on a right side and under the vehicle can be set as the region to be sensed by the first sensor 140 among the region around the first vehicle 200.

The transmission unit 115 transmits information that requests visual safety confirmation to the information terminal 300 associated with the user 10 in a case where the automatic driving unit 113 determines that the first vehicle 200 cannot start traveling.

The storage 120 is a main storage device such as a RAM and a ROM, or an auxiliary storage device such as an EPROM, a hard disk drive and a removable medium. The auxiliary storage device stores an operating system (OS), various kinds of programs, various kinds of tables, and the like, and can implement respective functions that match predetermined purposes of respective units of the controller 110 by the programs stored therein being executed. However, part or all of the functions may be implemented by hardware circuits such as an ASIC and an FPGA.

The storage 120 stores data, and the like, to be used or generated in processing to be performed by the controller 110. Further, the storage 120 may store data necessary for autonomous driving such as map data acquired from an external device.

The communication unit 130 includes a communication circuit that performs wireless communication. The communication unit 130 may be, for example, a communication circuit that performs wireless communication using 4G, 5G, LTE or a low power wide area (LPWA).

The first sensor 140 is a sensor for detecting an obstacle, or the like, on the road. The first sensor 140 is specifically a LiDAR, a camera, a radar, a sonar, or the like. The first sensor 140 may be a collection of a plurality of sensors having different types.

The first sensor 140 may be used to sense the region around the first vehicle 200 or may be used for the moving body 100 to autonomously travel.

The drive unit 150 is means for causing the moving body 100 to travel on the basis of the instruction from the automatic driving unit 113. The drive unit 150 can include, for example, a motor for driving wheels, an inverter, a brake, and a steering mechanism. The drive unit 250 may operate by power supplied from a battery.

Devices other than the moving body 100 will be described next.

The first vehicle 200 is typically a passenger car. The first vehicle 200 may be a bus, a track, or the like. The first vehicle 200 has a function of traveling while following the moving body 100 that leads the own vehicle. Specifically, the first vehicle 200 performs wireless communication with the moving body 100 that leads the own vehicle, receives an instruction (instruction information) for traveling from the moving body 100 and travels in accordance with the instruction information. The first vehicle 200 includes a controller 210, a storage 220, a communication unit 230, a second sensor 240, and a drive unit 250.

The controller 210 receives instruction information necessary for traveling while following the moving body 100 from the automatic driving unit 113 of the moving body 100 and controls the drive unit 250 on the basis of the received instruction information.

The controller 210 is implemented with a processor such as a CPU and a GPU, and a memory. The above-described functions of the controller 210 may be implemented by programs being executed by the controller 210.

The storage 220 is a storage device similar to the storage 120.

The storage 220 stores data, and the like, to be used or generated in processing to be performed by the controller 210. Further, the storage 120 may store data necessary for automatic driving (in the present embodiment, traveling while following the moving body 100) such as map data acquired from an external device.

The communication unit 230 is a communication unit including a communication circuit similar to the communication unit 130.

The second sensor 240 is a sensor for detecting an obstacle, or the like, on the road. The second sensor 240 is specifically, a LiDAR, a camera, a radar, a sonar, or the like. The second sensor 240 may be a plurality of types of sensors.

The controller 210 of the first vehicle 200 may implement safety confirmation around the vehicle when the vehicle is started using the second sensor 240.

The drive unit 250 is means for causing the first vehicle 200 to travel on the basis of the instruction from the controller 210. The drive unit 250 can include, for example, a motor for driving wheels, an inverter, a brake, and a steering mechanism. The drive unit 250 may operate by power supplied from a battery.

The information terminal 300 will be described next.

The information terminal 300 is a device such as a smartphone and a tablet terminal. The information terminal 300 may be a personal computer, or the like.

The controller 31 transmits a request (hereinafter, a rent request) for renting the first vehicle 200 to the server 400. Further, the controller 310 transmits a request (return request) that the user desires to return the first vehicle 200 at a predetermined location to the server 400 via the information terminal 300 when the first vehicle 200 is returned.

Further, the controller 310 receives a notification, and the like, to the user 10 transmitted from the moving body 100. The notification to the user 10 is, for example, information, or the like, that requests the user 10 of the first vehicle 200 to visually confirm safety around the first vehicle 200. The notification is transmitted from the moving body 100 in a case where it is suspected that an obstacle exists around the first vehicle 200, or the like.

The storage 320 is a storage device similar to the storage 120.

The storage 320 stores data, and the like, to be used or generated in processing to be performed by the controller 310.

The communication unit 330 is a communication unit including a communication circuit similar to the communication unit 130.

The display unit 340 is a display, or the like, that displays the notification, and the like, received by the controller 310.

The display unit 340 may be a touch panel display, an organic electro luminescence (EL) display or a liquid crystal display.

The server 400 is a server ("management server" described above) that provides a reservation service of various kinds of services in which the moving body 100 leads the first vehicle 200.

Specifically, the server 400 provides a reservation service, and the like, of a car sharing service, and the like. For example, the server 400 accepts reservation of the first vehicle 200 from the user 10 who has logged in the server 400. The server 400 that has accepted the reservation of the first vehicle 200 specifies the moving body 100 that leads the first vehicle 200 and transmits data necessary for leading the first vehicle 200 to the moving body 100. Examples of the data for necessary for leading the first vehicle 200 can include, for example, information regarding the user 10 and the first vehicle 200, route information (for example, route information from the station to the getting-on point) necessary for repositioning the first vehicle 200, map data, and the like.

Further, the server 400 receives a notification (return request) that the user 10 desires to return the first vehicle 200 from the information terminal 300 associated with the user 10. The server 400 that has received the return request transmits the information regarding the user 10 and the first vehicle 200, route information (for example, route information from the return point to the station) necessary for repositioning the first vehicle 200, map data, and the like, to the moving body 100.

Note that the configuration illustrated in FIG. 2 is one example, and all or part of the illustrated functions may be executed using a specially designed circuit. Further, a combination of a main storage device and an auxiliary storage device other than the illustrated devices may store or execute programs.

Figure 3:
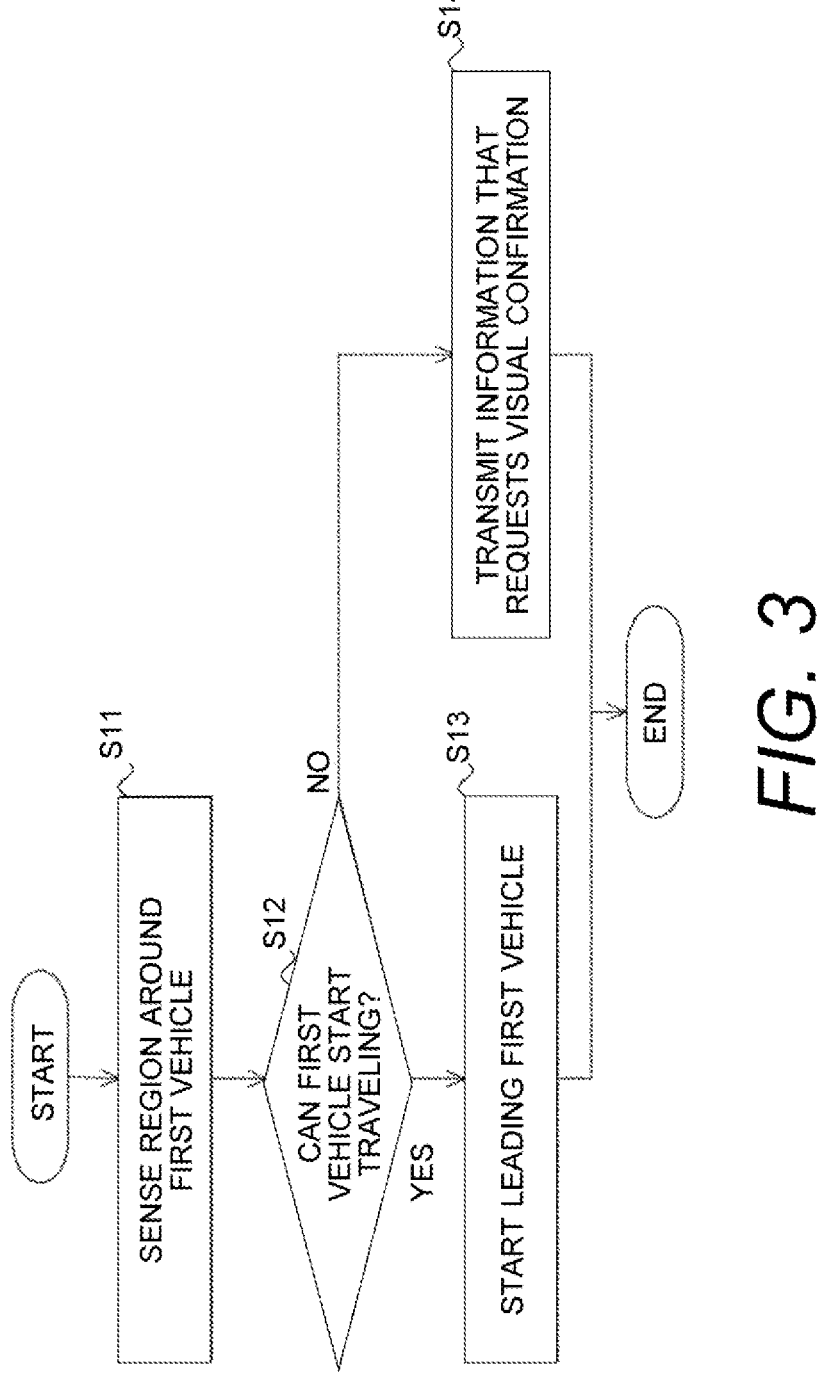
FIG. 3 is a flowchart of processing to be executed by a controller of the moving body according to the first embodiment.

Specific content of processing to be performed by the moving body 100 will be described next. FIG. 3 is a flowchart of the processing to be executed by the controller 110 of the moving body 100 according to the first embodiment. The illustrated processing is executed before the moving body 100 starts leading the first vehicle 200.

The moving body 100 receives position information of the first vehicle 200, route information to the position, and the like, from the server 400 and meets the first vehicle 200 by autonomously traveling in accordance with the route information.

First, in step S11, the sensing unit 111 performs sensing of the region around the first vehicle 200 with the first sensor 140. The sensing unit 111 detects whether or not an obstacle, a pedestrian, or the like, exists around the first vehicle 200 with the first sensor 140. A result of the sensing will be referred to as a first sensing result.

Then, in step S12, the automatic driving unit 113 determines whether or not the first vehicle 200 can start traveling on the basis of the first sensing result. In a case where an obstacle, or the like, is not detected in the region around the first vehicle 200 in step S11, the automatic driving unit 113 determines that the first vehicle 200 can start traveling and causes the processing to transition to step S13.

Note that in a case where an obstacle is detected in the region around the first vehicle 200 in step S11, the automatic driving unit 113 determines that the first vehicle 200 cannot start traveling and causes the processing to transition to step S14.

In a case where the processing transitions to step S13, the automatic driving unit 113 starts leading the first vehicle 200. The automatic driving unit 113 instructs the controller 210 of the first vehicle 200 to start and starts transmission of instruction information necessary for following traveling.

In a case where the processing transitions to step S14, the automatic driving unit 113 transmits information that requests the user 10 to visually confirm safety around the vehicle to the information terminal 300 associated with the user 10.

Note that in a case where the user 10 is not located in the vicinity of the first vehicle 200, the transmission unit 115 may transmit the notification to a predetermined device. For example, a device associated with a manager of the first vehicle 200 can be set as the predetermined device.

A method for sensing the region around the first vehicle 200 by the sensing unit 111 will be described in detail next. FIGS. 4A to 4F is a view illustrating an example of outline of safety confirmation of the region around the first vehicle 200 to be performed by the moving body 100 according to the first embodiment.

As illustrated in FIG. 4A, the moving body 100 approaches the first vehicle 200 from behind the first vehicle 200. First, the moving body 100 senses a region behind the first vehicle 200 and a region under and behind the first vehicle 200 with the first sensor 140. Here, the region under the first vehicle 200 refers to a region between a vehicle body of the first vehicle 200 and the road (road surface).

Then, as illustrated in FIG. 4B, the moving body 100 moves to the left side behind the first vehicle 200 and senses a region on the left side of the first vehicle 200.

Then, as illustrated in of FIG. 4C, the moving body 100 passes through the right side of the first vehicle 200 and senses a region on the right side of the first vehicle 200.

Then, as illustrated in FIG. 4D, the moving body 100 moves to the left side in front of the first vehicle 200 and senses the region on the left side of the first vehicle 200 again.

Then, as illustrated in FIG. 4E, the moving body 100 moves on a center line in front of the first vehicle 200 and senses a region in front of the first vehicle 200 and a region under and in front of the first vehicle 200.

In a case where there is no problem as a result of the sensing described above, the moving body 100 goes into a position in front of the first vehicle 200 as illustrated in FIG. 4F and starts leading the first vehicle 200.

In this manner, the moving body 100 performs sensing throughout the region around (on the side, in front of, behind and under) the first vehicle 200. Note that the order in which the moving body 100 performs sensing is not limited to the order illustrated in FIGS. 4A to 4F, and sensing may be performed in any order if the regions in all directions around the first vehicle 200 and under the first vehicle 200 can be confirmed. Further, the operation in FIG. 4B may be omitted.

Further, while in the above-described description, the moving body 100 meets the first vehicle 200 from behind the first vehicle 200, the moving body 100 may meet the first vehicle 200 from in front of the first vehicle 200. In this case, the moving body 100 goes around behind the first vehicle 200 once and performs sensing through the procedure illustrated in FIGS. 4A to 4F.

Note that while in the present embodiment, the moving body 100 performs sensing using the above-described method, as will be described later, the moving body 100 may acquire information that designates a region to be sensed from the server 400 and perform sensing on the designated region. Further, the moving body 100 may acquire information that designates a region to be sensed from the first vehicle 200 when the moving body 100 performs communication with the first vehicle 200 in FIG. 4A.

According to the first embodiment, it is possible to perform sensing in all directions of the region around the first vehicle 200 by the moving body 100. This enables confirmation as to whether or not there is an obstacle for a region that cannot be sensed only with the second sensor 240 mounted on the first vehicle 200, so that it is possible to secure safety when the first vehicle 200 is started.

Second Embodiment

In the first embodiment, the moving body 100 performs sensing over all directions of the region around the first vehicle 200. Specifically, in the first embodiment, the moving body 100 sequentially performs sensing throughout the region in front of, behind, on the left side, on the right side and under the vehicle among the region around the first vehicle 200.

However, the first vehicle 200 can also sense the region around the first vehicle 200 itself using the second sensor 240. In this case, there is a case where the moving body 100 does not have to sense a region sensed by the first vehicle 200.

In the second embodiment, to address this, the moving body 100 receives information regarding a partial region sensed by the first vehicle 200 itself using the second sensor 240 and executes sensing on a partial region that is not sensed.

In the second embodiment, the controller 210 of the first vehicle 200 generates a second sensing result at a timing at which the own vehicle has completed sensing and transmits the second sensing result to the moving body 100. The second sensing result includes data indicating positions of one or more partial regions sensed by the first vehicle 200. The reception unit 112 of the moving body 100 receives the second sensing result from the first vehicle 200 at a timing at which the moving body 100 meets the first vehicle 200.

Further, the determination unit 114 of the moving body 100 determines a partial region to be sensed by the first sensor 140 among the region around the first vehicle 200 on the basis of the second sensing result received by the reception unit 112. The determination unit 114 determines a partial region (blind area region) that cannot be sufficiently sensed by the second sensor 240 of the first vehicle 200 on the basis of the second sensing result and determines the partial region as a region to be sensed.

Figure 5:
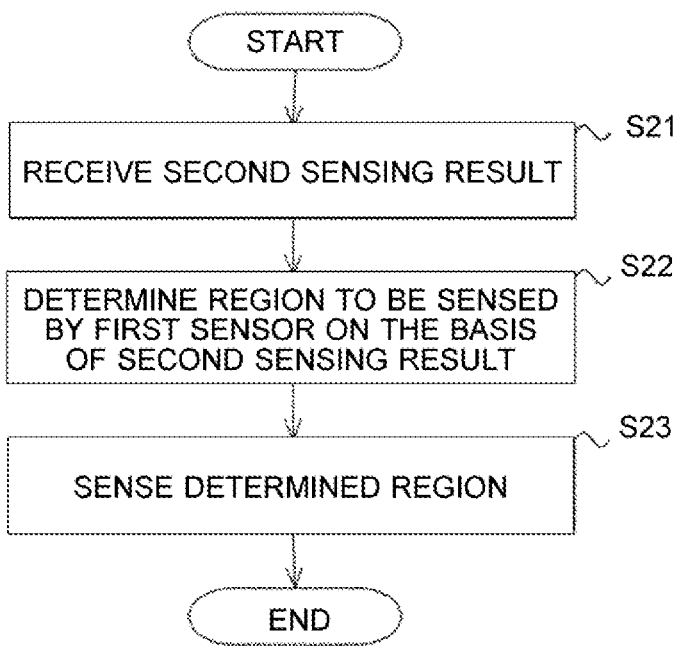
FIG. 5 is a flowchart of processing to be executed by a controller of a moving body according to a second embodiment.

FIG. 5 is a flowchart of processing to be executed by the controller 110 of the moving body 100 according to the second embodiment. FIG. 5 is an example specifically describing the processing to be executed in step S11 in FIG. 3.

First, in step S21, the reception unit 112 receives the second sensing result. This enables the reception unit 112 to acquire information regarding a position of a region that has already been sensed by the second sensor 240.

Then, in step S22, the determination unit 114 determines a partial region to be sensed by the first sensor 140 on the basis of the second sensing result. For example, the determination unit 114 determines a region not sensed by the second sensor 240 as the partial region to be sensed by the first sensor 140.

Then, in step S23, the sensing unit 111 senses the partial region determined by the determination unit 114. In other words, the sensing unit 111 executes sensing on the region not sensed by the second sensor 240.

In this manner, in the second embodiment, the moving body 100 determines the region to be sensed by the moving body 100 itself on the basis of the information received from the first vehicle 200 and senses the determined region. This enables the moving body 100 to perform sensing on the region that cannot be sensed by the first vehicle 200.

Third Embodiment

There is a case where different types of sensors are mounted between the first vehicle 200 and the moving body 100. Further, there is a case where accuracy of sensing results is different depending on types of sensors. Thus, to improve accuracy of sensing, it is preferable to perform sensing on the same region using different types of sensors.

It is assumed, for example, that the first vehicle 200 has sensed a predetermined region using the second sensor 240. In this case, in a case where the moving body 100 has a sensor of a type different from the type of the second sensor 240, it is possible to improve determination accuracy of an obstacle, or the like, by the moving body 100 sensing the region again using the sensor.

To address this, the third embodiment is an embodiment in which the moving body 100 executes sensing using a sensor of a type different from a type of a sensor used by the first vehicle 200 for sensing.

For example, in a case where the first vehicle 200 senses a predetermined region using an image sensor, the moving body 100 can sense the same region using an ultrasonic sensor. This can improve determination accuracy of an obstacle, or the like.

Processing to be executed by the controller 110 in the third embodiment will be described.

First, the determination unit 114 receives a third sensing result from the first vehicle 200 and determines a type of the first sensor 140 to be used by the moving body 100 for sensing on the basis of the third sensing result. The third sensing result includes positions of one or more partial regions sensed by the first vehicle 200 and the type of the second sensor 240 utilized by the first vehicle 200.

The determination unit 114 determines to perform sensing by utilizing a sensor of a type different from the type of the second sensor 240 used by the first vehicle 200 for sensing.

This enables the moving body 100 to sense the same region with a sensor of a type different from the type of the sensor of the first vehicle 200. In this manner, by using different types of sensors, it is possible to improve accuracy in sensing.

Fourth Embodiment

In the third embodiment, the same region is checked in an overlapped manner using different types of sensors. However, also in a case where sensing is performed only with one type of a sensor, there is a case where it is not necessary to sense the same region again using a different type of a sensor in a case where reliability is sufficiently high.

To address this, the fourth embodiment is an embodiment in which the moving body 100 determines a region to be sensed using the first sensor 140 by the moving body 100 itself on the basis of reliability when the first vehicle 200 performs sensing using the second sensor 240.

In the fourth embodiment, in a similar manner to the third embodiment, the controller 210 of the first vehicle 200 transmits the third sensing result to the moving body 100. The third sensing result includes positions of one or more partial regions sensed by the first vehicle 200 and information regarding a type of the second sensor 240 utilized by the first vehicle 200.

The determination unit 114 calculates reliability of obstacle detection by the second sensor 240 in respective partial regions constituting the region around the first vehicle 200 on the basis of the third sensing result received from the first vehicle 200.

For example, the reliability in obstacle detection can vary depending on types of sensors used in sensing, environments when sensing is executed, and the like. The moving body 100 may calculate the reliability in obstacle detection on the basis of such information.

Note that the third sensing result may include additional information for calculating the above-described reliability.

Figure 6:
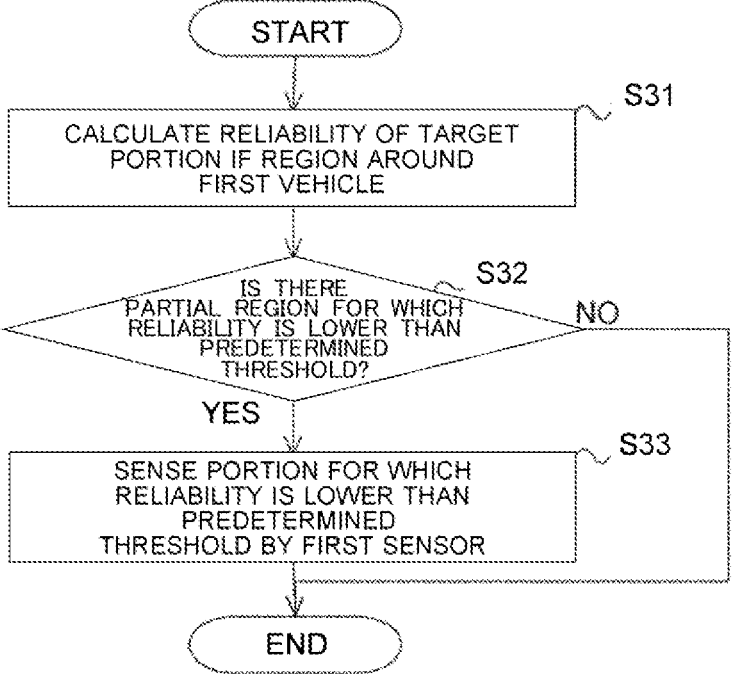
FIG. 6 is a flowchart of processing to be executed by a controller of a moving body according to a fourth embodiment.

FIG. 6 is a flowchart of processing to be executed by the controller 110 of the moving body 100 according to the fourth embodiment. The processing in FIG. 6 is an embodiment of the processing to be executed in step S11 in FIG. 3. After processing ends in step S33 or step S32, the processing transitions to step S12.

First, in step S31, the determination unit 114 calculates reliability of obstacle detection performed by the first vehicle 200 on the basis of the third sensing result received from the first vehicle 200. The determination unit 114 may divide the region around the first vehicle 200 into a plurality of partial regions and calculate the reliability for each partial region. Here, the reliability is a value representing height of accuracy of obstacle detection by the second sensor 240 mounted on the first vehicle 200. For example, the determination unit 114 may calculate higher reliability for higher accuracy of the second sensor 240. The reliability of obstacle detection by the second sensor 240 may be higher as a ratio of the number of times that the second sensor 240 can acquire data without error in each partial region is higher.

Then, in step S32, the sensing unit 111 determines whether or not there is a partial region for which the reliability of obstacle detection is lower than a predetermined threshold among the plurality of partial regions obtained by dividing the region around the first vehicle 200. The sensing unit 111 determines whether or not the reliability of obstacle detection is lower than the predetermined threshold for each of the plurality of partial regions included in the region around the first vehicle 200. In a case where the sensing unit 111 determines that there is a partial region for which the reliability of obstacle detection is lower than the predetermined threshold among the divided plurality of partial regions, a positive determination result is obtained in the present step.

In a case where a positive determination result is obtained in step S32, the processing proceeds to step S33.

In a case where a negative determination result is obtained in step S32, the processing ends.

In a case where the processing transitions to step S33, the sensing unit 111 senses the partial region for which the reliability is determined to be lower than the predetermined threshold among the region around the first vehicle 200 using the first sensor 140.

According to the fourth embodiment, by utilizing the reliability of obstacle detection, it is possible to reduce cost for performing sensing.

(Modification)

The above-described embodiments are merely one example, and the present disclosure can be modified as appropriate and implemented within a range not deviating from the gist of the present disclosure.

For example, the processing and means described in the present disclosure can be freely combined and implemented unless technical contradiction arises.

Further, the processing described as being performed by one device may be shared and executed by a plurality of devices. Alternatively, the processing described as being performed by different devices may be performed by one device. In the computer system, it is possible to flexibly change what kind of hardware configuration (server configuration) each function is realized.

The present disclosure can also be realized by supplying a computer program implementing the functions described in the above embodiment to a computer, and one or more processors included in the computer read out and execute the program. Such computer programs may be provided to a computer by a non-transitory computer-readable storage medium connectable to a system bus of the computer, or may be provided to the computer over a network. A non-transitory computer-readable storage medium includes, for example, any type of disk, such as a magnetic disk (floppy disk, hard disk drive (HDD), etc.), an optical disk (CD-ROM, DVD disk, Blu-ray disk, etc.), read-only memory (ROM), random access memory (RAM), EPROM, EEPROM, magnetic card, flash memory, optical card, any type of medium suitable for storing electronic instructions.

What is claimed is:

1. A moving body capable of autonomously traveling and having a function of leading a first vehicle that travels while following the moving body, the moving body comprising:
a communication unit that receives a first sensing result from the first vehicle, the first sensing result being associated with one or more regions from a plurality of predetermined regions around the first vehicle;
a first sensor that is configured to detect an obstacle; and
a controller configured to use a predetermined threshold to determine a reliability of detecting the obstacle from the plurality of regions around the first vehicle by the first sensor before the moving body starts leading the first vehicle,
wherein in response to the determined reliability being above the predetermined threshold, the controller causes the moving body to autonomously travel ahead of the first vehicle and transmit instruction information to the first vehicle so that the first vehicle travels based on the received instruction information.

2. The moving body according to claim 1,
wherein the controller
determines whether or not the first vehicle can start traveling on a basis of the first sensing result that is a result of sensing of the one or more regions around the first vehicle by the first sensor, and
starts leading the first vehicle by causing the transmission of the instruction information, in a case where it is determined that the first vehicle can start traveling.

3. The moving body according to claim 1,
wherein the controller
receives, from the first vehicle, a second sensing result which is a result of sensing of the one or more regions around the first vehicle by a second sensor mounted on the first vehicle and which includes information regarding the one or more regions for which sensing is executed by the second sensor among the plurality of regions around the first vehicle, and
determines a partial region to be sensed by the first sensor among the one or more regions around the first vehicle on a basis of the second sensing result.

4. The moving body according to claim 1,
wherein the controller
receives, from the first vehicle, a third sensing result which is a result of sensing of the one or more regions around the first vehicle by a second sensor mounted on the first vehicle and which includes information regarding a type of the second sensor, and
senses the one or more regions for which sensing is executed by the second sensor using the first sensor that is a sensor of a type different from the type of the second sensor on a basis of the third sensing result.

5. The moving body according to claim 4,
wherein the controller
calculates the reliability of detecting the obstacle using the second sensor in respective partial regions constituting the plurality of regions around the first vehicle on a basis of the third sensing result received from the first vehicle, and
senses the partial region for which the reliability is lower than the predetermined threshold using the first sensor that is the sensor of the type different from the type of the second sensor.

* * * * *